(12) United States Patent
Nadeau et al.

(10) Patent No.: US 11,025,652 B2
(45) Date of Patent: *Jun. 1, 2021

(54) IN-APP BEHAVIOR-BASED ATTACK DETECTION

(71) Applicant: salesforce.com, inc., San Francisco, CA (US)

(72) Inventors: Philip Raymond Nadeau, Bothell, WA (US); Tejinder Singh Aulakh, Fremont, CA (US); Ping Yan, San Francisco, CA (US); Huy Nhut Hang, San Bruno, CA (US)

(73) Assignee: salesforce.com, inc., San Francisco, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/247,445

(22) Filed: Jan. 14, 2019

(65) Prior Publication Data
US 2019/0387006 A1   Dec. 19, 2019

Related U.S. Application Data

(63) Continuation of application No. 15/058,954, filed on Mar. 2, 2016, now Pat. No. 10,182,063.

(51) Int. Cl.
*G06F 21/55* (2013.01)
*G06F 21/50* (2013.01)
(Continued)

(52) U.S. Cl.
CPC ........ *H04L 63/1416* (2013.01); *G06F 21/554* (2013.01); *G06N 20/00* (2019.01);
(Continued)

(58) Field of Classification Search
CPC ............ H04L 63/1416; H04L 63/1425; H04L 63/1441; H04L 63/1408; H04L 63/20;
(Continued)

(56) References Cited

U.S. PATENT DOCUMENTS 5,577,188 A    11/1996 Zhu
5,608,872 A     3/1997 Schwartz et al.
(Continued)

OTHER PUBLICATIONS

Final Office Action for U.S. Appl. No. 15/058,954 dated Jun. 29, 2017, 17 pages.
(Continued)

*Primary Examiner* — Alexander Lagor
(74) *Attorney, Agent, or Firm* — Jaffery Watson Mendonsa & Hamilton LLP

(57) ABSTRACT

Architectures and techniques for in-app behavior detection. A behavior detection agent within an application running on a hardware computing device captures events within the application. The events are inputs received from one or more sources external to the application. The behavior detection agent generates an event stream from the captured events. The behavior detection agent analyzes the event stream for significant feature frequencies and associations corresponding to one or more attack profiles. The behavior detection agent initiates an attack response in response to finding one or more significant feature frequencies and associations. The attack response comprises at least changing an operational configuration of the application.

20 Claims, 4 Drawing Sheets

(51) Int. Cl.
  *G06F 21/00*   (2013.01)
  *H04L 29/06*   (2006.01)
  *G06N 20/00*   (2019.01)
  *G06N 5/00*    (2006.01)

(52) U.S. Cl.
  CPC ...... *H04L 63/1425* (2013.01); *H04L 63/1441* (2013.01); *G06N 5/003* (2013.01)

(58) Field of Classification Search
  CPC ... H04L 63/14; H04L 63/145; H04L 63/1458; H04L 63/1466; G06F 21/554; G06F 21/55
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0131847 A1* | 6/2005 | Weston ............... G06K 9/623 706/12 |
| 2009/0177744 A1 | 7/2009 | Marlow et al. |
| 2009/0313699 A1* | 12/2009 | Jang .................. G06F 21/554 726/23 |
| 2015/0379405 A1* | 12/2015 | Jenson ............... G06F 21/552 706/47 |
| 2016/0088108 A1* | 3/2016 | Felts .................... H04L 67/28 709/223 |
| 2017/0076217 A1* | 3/2017 | Krumm .................. G06N 20/00 |
| 2017/0318034 A1* | 11/2017 | Holland ............. H04L 63/1416 |

OTHER PUBLICATIONS

Non-Final Office Action for U.S. Appl. No. 15/058,954 dated Jan. 11, 2018, 19 pages.
Non-Final Office Action for U.S. Appl. No. 15/058,954 dated Nov. 1, 2016, 19 pages.

(56) References Cited

OTHER PUBLICATIONS

Notice of Allowance for U.S. Appl. No. 15/058,954 dated Sep. 13, 2018, 9 pages.

* cited by examiner

IN-APP BEHAVIOR-BASED ATTACK DETECTION

CLAIM OF PRIORITY

This continuation patent application claims the benefit of U.S. patent application Ser. No. 15/058,954, filed Mar. 2, 2016, entitled "IN-APP BEHAVIOR-BASED ATTACK DETECTION", now U.S. Pat. No. 10,182,063, issuing Jan. 15, 2019, which is incorporated herein by reference in its entirety.

TECHNICAL FIELD

Embodiments relate to electronic data security. More particularly, embodiments relate to techniques for monitoring accesses to electronic data/resources to identify patterns that indicate an attack.

BACKGROUND

Data/resource security is a wide-ranging problem for nearly all users of electronic devices. Many strategies have been developed for detection of attacks. However, these strategies are generally reactive in that detection and/or correction only occurs after attacks have occurred. Thus, using traditional techniques, data/resources are exposed to novel attack vectors.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
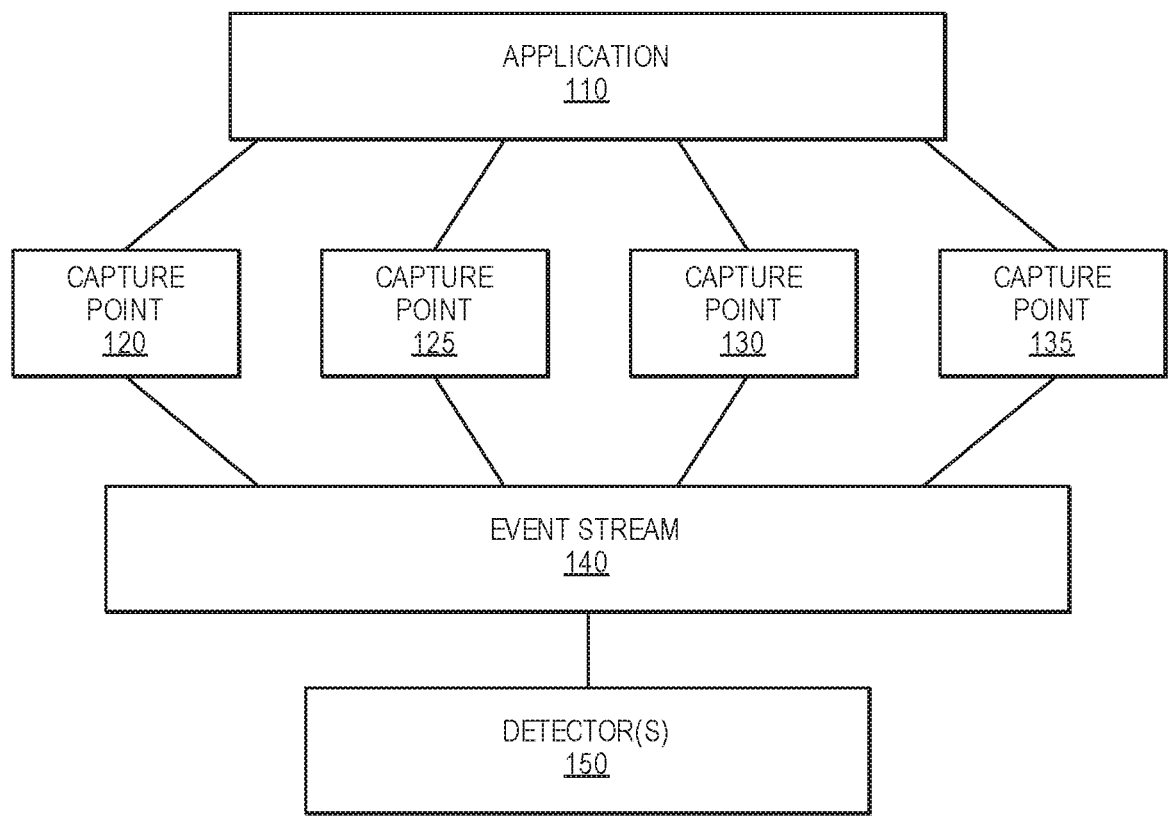
FIG. 1 is a conceptual block diagram of an architecture that can utilize behavior detection as described herein.

In the following description, numerous specific details are set forth. However, embodiments of the invention may be practiced without these specific details. In other instances, well-known architectures, structures and techniques have not been shown in detail in order not to obscure the understanding of this description.

Described herein are various embodiments of a logic-based attack pattern induction via sub-exhaustive satisfiability tests. In one embodiment, given known positive and negative instances, the architecture described herein can find a minimum form of a Boolean function that satisfies use cases at an optimal (or near optimal) accuracy level. The techniques described herein contrast with traditional classification techniques in that a white box solution is produced in a logic-based form that traditional signature-based detection can utilize. However, the techniques described herein provide superior mathematical formulation for signature discovery and can support signature search that optimally satisfies known data instances.

In the following formulation, the inputs are binary feature vectors of training data. Let $\{f0, f1, \ldots fn\}$ be a set of n Boolean features. Each feature can either be true (denoted by 1) or false (denoted by 0). Let $F(f)$ be a Boolean function over these features. For example, the expression $$\{fi \text{ AND } fj\} \text{ OR } \{fm \text{ AND } fn\}$$

is an example Boolean function where "AND" and "OR" are logical operators.

The problem is to find $F(f)$, a mapping from $\{0,1\}n \rightarrow \{0,1\}$ that determines for each combination of truth values of the features $f0, f1, \ldots fn$, whether F is true or false. A global optimal solution to solve this problem requires an exhaustive search of all combinations of the n features in all possible forms. The enumeration of all such combinations has an exponential complexity.

In one embodiment, the following sub-optimal three-phase solution may be utilized to achieve a satisfactory result. In one embodiment, in the first phase, use of prior experience/knowledge/results can be utilized to determine the chances that certain features observed as positive or negative in the training data can be used to select a subset of features. In one embodiment, a set of positive features is selected and a set of negative features is selected. The search space for the positive set and the negative set is significantly less than n.

In one embodiment, the second phase involves a satisfiability test (SAT). For all possible forms of F:

DetectedPositive=(True, SAT(training data))
TP=Intersection_of (KnownPositive, Detected Positive)
FP=Intersection_of (DetectedPositive, KnownNegative)

In one embodiment, the final phase produces a sub-optimal Boolean function in which detection rules are ranked by satisfiability rates (TP, FP). This final function can be utilized to provide rules utilized in a logic-based attack pattern detection mechanism.

As described in greater detail below, in one example, techniques described herein use this strategy to formulate rules and/or detection mechanisms to detect unauthorized behavior that may appear to be legitimate actions. For example, a Dyre attack is a phishing based attack in which login information is obtained and used by an unauthorized attacking party to gain access to secure resources using the stolen login information. Once access is gained by the attacking party, legitimate actions can be taken to steal data or perform other actions. For example, the attacker can download personal information (e.g., credit card numbers, social security numbers) that the authorized user may have legitimate reasons to access.

For example, using the techniques described above, the selected features may be used to detect an unauthorized change in operator followed by data exfiltration. In one embodiment, timing relationships between features may be utilized. Continuing the Dyre example, the data exfiltration may be considered an attack if it happens within a relatively short period of time after the unauthorized change in operator, but if the same events happen after a longer period of time it may not be considered an attack. That is, in one embodiment, to be considered an attack a sequence of conditions/events must happen in a particular order and within a particular timeframe.

In one embodiment, the timing relationship is captured in one of the features that used in the Boolean function. For example, for two events, event1 (timestamp1, ip1, user does something), and event2 (timestamp2, ip2, user does something), these two events can be abstracted into two feature vectors F_event1=[time1, ip1, time_since_last_event], F_event2=[time2, ip2, time_since_last_event]. In one embodiment, the last element in the feature vector is the feature that captures the timing relationship between events. In one embodiment, if the two events happen too close together in time (e.g., say 0.001 sec), this can indicate a non-human action, with which can indicate scripted (e.g., malware) behavior.

In one embodiment, the detection mechanism exists within an application and monitors behavior at the application level. For example, the detection mechanism can be part of an app operating within a tenant environment of a multi-tenant environment where each tenant has its own private space and/or data (e.g., a multi-tenant database environment). By operating within the application (or a similar configuration), the detection mechanism can quickly react to detected behaviors and trigger the corresponding response(s).

In one embodiment, the detection mechanism can be trained offline (e.g., using the solution outlined above and/or other techniques). In one embodiment, log files generated from previous activity can be used for training purposes. In one embodiment, training can include information based on statistical markers from known attacks and/or extrapolation of information based on known attacks. Thus, the detection mechanism can detect/monitor patterns of behavior and/or profiles at an application level rather than static signatures at the transport level.

FIG. 1 is a conceptual block diagram of an architecture that can utilize behavior detection as described herein. The various components of FIG. 1 can be included in an application or they can be spread across multiple components. In one embodiment, the components of FIG. 1 are associated with an on-demand services environment, for example, a multitenant database environment or a customer relations management (CRM) environment. However, the components of FIG. 1 are suitable for use in other environments as well.

Application 110 represents any type of application that can run on an electronic computing device (not illustrated in FIG. 1). An electronic computing device can be, for example, a desktop computer system, a laptop computer system, a tablet, a smartphone, a kiosk, a wearable computing device. Application 110 can represent any type of application. In one embodiment, application 110 is an application that a user utilizes to interact with one or more electronic resources.

In one embodiment, application 110 includes one or more capture points (e.g., 120, 125, 130, 135) that trigger capture of information associated with the capture point. Capture points can include, for example, user login, user logout, triggering and/or completing of two-factor authentication, request and/or generation of a report, request and/or exfiltration of data. Many other and/or different capture points can be supported.

In one embodiment, information from the capture points is compiled as event stream 140. In one embodiment, event stream 140 includes the captured event information as well as relationships (e.g., sequence, timing) between events. As discussed above, the sequence and/or timing of events can be considered when detecting an attack. In one embodiment, detector(s) 150 analyze event stream 140 to determine if an attack has occurred or is occurring. If an attack, or other unauthorized event, is detected appropriate action can be taken.

Because the monitoring is within (or by) the application and user-level behavior is monitored, reaction to attacks can be much faster than with traditional techniques. The techniques described herein further provide the ability to detect/monitor more complex situations and sequences than traditional techniques. In one embodiment, the situations and/or sequences that indicate an attack can be determined through statistical processes.

Figure 2:
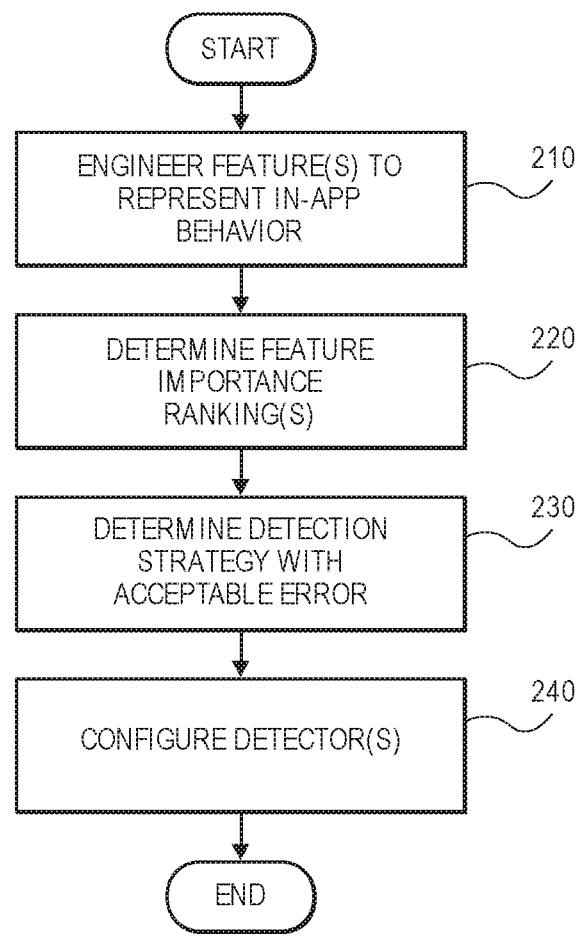
FIG. 2 is a flow diagram of one technique for initializing one or more detectors for behavior detection as described herein.

FIG. 2 is a flow diagram of one technique for initializing one or more detectors for behavior detection as described herein. In one embodiment, the operations associated with FIG. 2 are part of a guided learning process in which the one or more detectors (e.g., 150 in FIG. 1) can be prepared for operating to preform the behavioral monitoring and/or detection described herein.

A set of one or more features can be engineered/generated to represent relevant in-app behavior that can be used to provide the functionality described herein, 210. In one embodiment, one or more features that indicate a profile and/or pattern corresponding to an attack can be represented via one or more feature vectors as described above. In one embodiment, this can be accomplished via analysis of log files corresponding to attacks or attempted attacks. The analysis can be performed manually by one or more people with appropriate knowledge of attacks and/or the analysis can be performed in an automated manner. Other sources can be analyzed for pattern information. In another embodiment, one or more features of an anticipated or theoretical attacks can be utilized in a similar manner.

In one embodiment, the features that are used for attack detection are ranked, sequenced and/or otherwise prioritized, 220. As discussed above, various events may have significant frequencies and/or associations to indicate whether the event is part of an attack or not. For example, a change in operator occurs shortly after a login event may indicate an attack, while a change in operator at a later time may not indicate an attack.

The detection strategy having an acceptable error rate to be utilized are determined, 230. In one embodiment, an acceptable error rate is utilized to determine whether the feature set selected results in an excessively high error rate or an unacceptably low detection rate.

The detector(s) is/are configured, 240. In one embodiment, the events, sequences and/or timing of the events is/are provided to one or more detectors. The detectors can monitor the event stream (e.g., 140 in FIG. 1) to determine whether at attack is detected. In one embodiment, when one or more detectors find indications of an attack, a response is triggered. The response can be, for example, shutting down an account, notifying a system administrator, preventing further access to data, etc.

Figure 3:
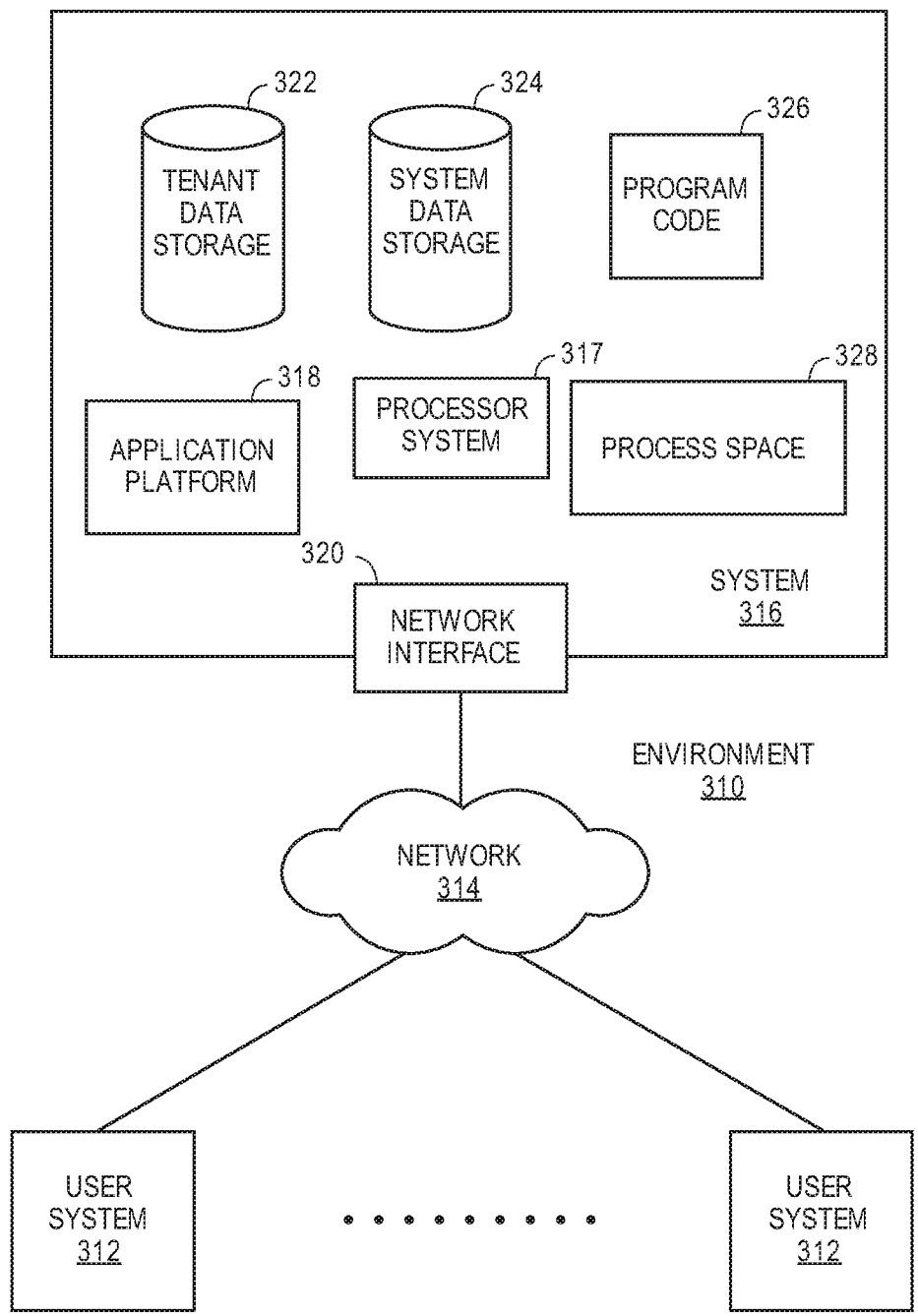
FIG. 3 illustrates a block diagram of an environment where an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
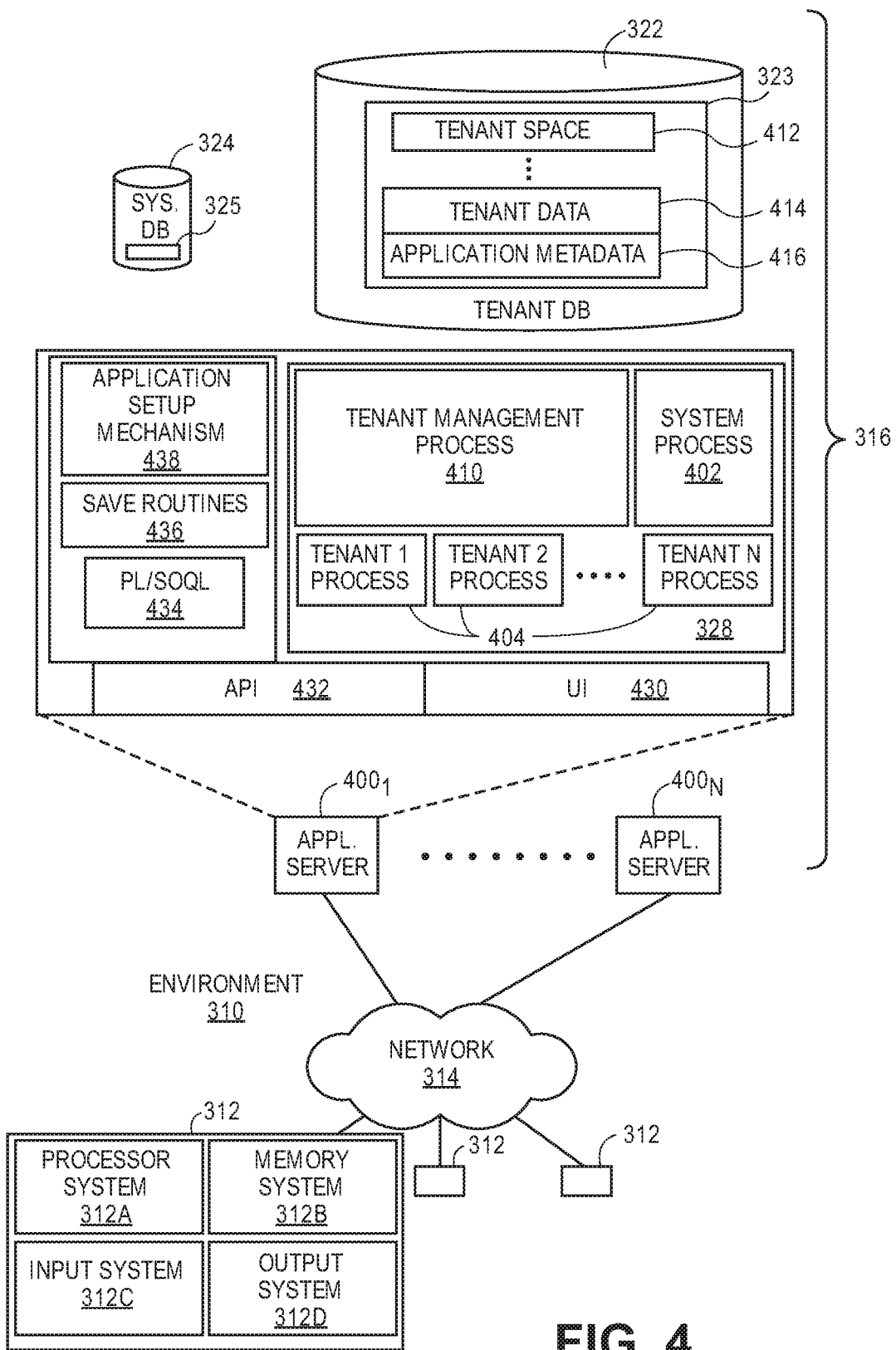
FIG. 4 illustrates a block diagram of an environment where an on-demand database service might be provided.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage space 412, tenant data 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage spaces 412, which can be either a physical arrangement and/or a logical arrangement of data. Within each tenant storage space 412, tenant data 414 and application metadata 416 might be similarly allocated for each user. For example, a copy of a user's most recently used (MRU) items might be stored to tenant data 414. Similarly, a copy of MRU items for an entire organization that is a tenant might be stored to tenant storage space 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:
   receive, with a behavior detection agent in a hardware computing platform, a set of feature vectors, each feature vector having at least timing and event information for a corresponding event;
   apply, with the behavior detection agent, to the set of feature vectors a sub-optimal, multi-phase analysis to determine probabilities that selected features observed as positive or negative will occur;
   select a subset of features, with the behavior detection agent, based on the determined probabilities;
   generate, from the selected subset of features with the behavior detection agent, at least one sub-optimal function having an ordered set of feature detection rules;
   formulate, with the behavior detection agent, an attack response based on the at least one sub-optimal function to be utilized in an attack pattern detection mechanism; and
   apply the attack response within at least the hardware computing platform via the behavior detection agent.

2. The non-transitory computer-readable medium of claim 1 wherein the multi-phase analysis comprises pattern induction via sub-exhaustive satisfiability tests.

3. The non-transitory computer-readable medium of claim 1 wherein the set of feature vectors corresponds to captured events in an event stream.

4. The non-transitory computer-readable medium of claim 1, wherein at least one phase of the analysis comprises use of prior results to determine one or more probabilities that selected features observed as positive or negative in training data can be used to select a subset of features for the feature vector.

5. The non-transitory computer-readable medium of claim 4 wherein significant feature frequencies and associations is described by a Boolean function based on known positive and negative instances of selected conditions.

6. The non-transitory computer-readable medium of claim 5 wherein the Boolean function is generated by:
   analyzing prior results to determine, for each of the significant features, determining an intersection of known positives and detected positives, and an intersection of detected positives and known negatives; and
   producing a sub-optimal Boolean function in which detection rules are ranked by satisfiability rates.

7. The non-transitory computer-readable medium of claim 4 wherein at least a portion of the prior results are acquired from one or more log files.

8. The non-transitory computer-readable medium of claim 5 wherein the significant feature frequencies and associations comprises at least a timing between a first event and a second event.

9. A system comprising:
   a memory system having one or more memory devices;
   one or more hardware processors coupled with the memory system, the one or more hardware processors configurable to receive a set of feature vectors, each feature vector having at least timing and event information for a corresponding event, to apply to the set of feature vectors a sub-optimal, multi-phase analysis to determine probabilities that selected features observed as positive or negative will occur, to select a subset of features based on the determined probabilities, to generate, from the selected subset of features, at least one sub-optimal function having an ordered set of feature detection rules, to formulate an attack response based on the at least one sub-optimal function to be utilized in an attack pattern detection mechanism, and to apply the attack response within at least the hardware computing platform.

10. The system of claim 9 wherein the multi-phase analysis comprises pattern induction via sub-exhaustive satisfiability tests.

11. The system of claim 9 wherein the set of feature vectors corresponds to captured events in an event stream.

12. The system of claim 9, wherein at least one phase of the analysis comprises use of prior results to determine one or more probabilities that selected features observed as positive or negative in training data can be used to select a subset of features for the feature vector.

13. The system of claim 12 wherein significant feature frequencies and associations is described by a Boolean function based on known positive and negative instances of selected conditions.

14. The system of claim 13 wherein the Boolean function is generated by:
   analyzing prior results to determine, for each of the significant features, determining an intersection of known positives and detected positives, and an intersection of detected positives and known negatives; and
   producing a sub-optimal Boolean function in which detection rules are ranked by satisfiability rates.

15. The system of claim 12 wherein at least a portion of the prior results are acquired from one or more log files.

16. The system of claim 13 wherein the significant feature frequencies and associations comprises at least a timing between a first event and a second event.

17. A non-transitory computer-readable medium having stored thereon instructions that, when executed by one or more processors, are configurable to cause the one or more processors to:
   receive, with a behavior detection agent in a hardware computing platform, a set of feature vectors, each feature vector having at least timing and event information for a corresponding event;
   apply, with the behavior detection agent, to the set of feature vectors a sub-optimal, multi-phase analysis to determine probabilities that selected features observed as positive or negative will occur;
   select a subset of features, with the behavior detection agent, based on the determined probabilities;
   generate, from the selected subset of features with the behavior detection agent, at least one sub-optimal function having an ordered set of feature detection rules;

formulate, with the behavior detection agent, an attack response based on the at least one sub-optimal function to be utilized in an attack pattern detection mechanism; and apply the attack response within at least the hardware computing platform via the behavior detection agent.

18. The method of claim 17 wherein the multi-phase analysis comprises pattern induction via sub-exhaustive satisfiability tests.

19. The method of claim 17 wherein the set of feature vectors corresponds to captured events in an event stream.

20. The method of claim 17, wherein at least one phase of the analysis comprises use of prior results to determine one or more probabilities that selected features observed as positive or negative in training data can be used to select a subset of features for the feature vector.

\* \* \* \* \*